United States Patent
Zhang et al.

(10) Patent No.: US 12,505,659 B2
(45) Date of Patent: Dec. 23, 2025

(54) COMPUTING APPARATUS AND METHOD FOR PERFORMING REINFORCEMENT LEARNING USING MULTIMODAL ARTIFICIAL INTELLIGENCE AGENT

(71) Applicant: SEOUL NATIONAL UNIVERSITY R&DB FOUNDATION, Seoul (KR)

(72) Inventors: Byoung-Tak Zhang, Seoul (KR); Hyun Seok Oh, Seoul (KR); Kwanyoung Park, Bucheon-si (KR); Youngki Lee, Seoul (KR); Minsu Lee, Seongnam-si (KR); Min Whoo Lee, Yongin-si (KR); Ganghun Lee, Seoul (KR); Junseok Park, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 365 days.

(21) Appl. No.: 18/061,266

(22) Filed: Dec. 2, 2022

(65) Prior Publication Data
US 2023/0177820 A1    Jun. 8, 2023

(30) Foreign Application Priority Data
Dec. 3, 2021    (KR) .................. 10-2021-0172384

(51) Int. Cl.
*G06V 10/00* (2022.01)
*G06F 3/16* (2006.01)
(Continued)

(52) U.S. Cl.
CPC ............... *G06V 10/82* (2022.01); *G06F 3/16* (2013.01); *G06T 17/00* (2013.01); *G06V 10/764* (2022.01); *G06V 10/771* (2022.01)

(58) Field of Classification Search
CPC .......... G06N 3/08; G06N 3/008; G06N 3/042; G06N 3/045; G06N 3/047; G06N 3/082;
(Continued)

(56) References Cited

U.S. PATENT DOCUMENTS 10,748,061 B2 *  8/2020  Jiang ..................... B25J 9/163
10,970,623 B2 *  4/2021  Nagaraja ................ G06N 3/08
(Continued)

FOREIGN PATENT DOCUMENTS

| KR | 10-1086671 A | 11/2011 |
| KR | 10-2019-0076628 A | 7/2019 |
| KR | 10-2021-0086131 A | 7/2021 |

OTHER PUBLICATIONS

Interactive Agents Group, 'Imitating Interactive Intelligence', DeepMind, arXiv:2012.05672v2 [cs.LG], Jan. 21, 2021 (96 pages).
(Continued)

*Primary Examiner* — Amir Alavi
(74) *Attorney, Agent, or Firm* — Sughrue Mion, PLLC

(57) ABSTRACT

Disclosed herein are a computing apparatus and method for performing reinforcement learning using a multimodal artificial intelligence agent. The method for performing reinforcement learning using a multimodal artificial intelligence agent includes: dividing frames, included in images acquired by capturing a virtual environment, into a plurality of sections; and performing reinforcement learning by applying any one of a plurality of guidance types to each of the plurality of sections and then allowing a multimodal artificial intelligence agent to interact with the virtual environment through the images. The plurality of guidance types is classified into three or more types according to their guidance level. Performing the reinforcement learning is performing reinforcement learning by applying a moderate-level guidance type to the sections of predetermined critical
(Continued)

periods and also applying any one of the plurality of guidance types to the other sections.

8 Claims, 7 Drawing Sheets

(51) Int. Cl.
  *G06T 17/00* (2006.01)
  *G06V 10/764* (2022.01)
  *G06V 10/771* (2022.01)
  *G06V 10/82* (2022.01)
(58) Field of Classification Search
  CPC .... G06N 3/092; G06N 3/0454; G06N 3/0475; G06N 3/0464; G06V 10/82; G06V 10/764; G06V 10/771; H04N 19/239; G06F 3/16; G06F 3/167; G06T 7/00
  See application file for complete search history.

(56) References Cited

U.S. PATENT DOCUMENTS

| | | | |
|---|---|---|---|
| 10,973,590 B2* | 4/2021 | Boddington | G16H 30/40 |
| 11,514,894 B2* | 11/2022 | Sejpal | G10L 15/26 |
| 11,540,794 B2* | 1/2023 | Boddington | A61B 6/12 |
| 11,568,246 B2* | 1/2023 | Yeh | G06N 3/08 |
| 11,613,384 B2* | 3/2023 | Haney | B64G 1/36 |
| | | | 701/13 |
| 11,622,098 B2* | 4/2023 | Jeong | G06T 17/20 |
| | | | 348/56 |
| 2018/0260700 A1 | 9/2018 | Nagaraja | |
| 2021/0200923 A1 | 7/2021 | Jang et al. | |
| 2022/0087644 A1* | 3/2022 | Patil | G16H 40/63 |
| 2023/0115037 A1* | 4/2023 | deFreese | G05B 19/4183 |
| | | | 700/109 |
| 2023/0177820 A1* | 6/2023 | Zhang | G06V 10/764 |
| | | | 382/156 |

OTHER PUBLICATIONS

Christian Arzate Cruz, et al., "A Survey on Interactive Reinforcement Learning: Design Principles and Open Challenges", DIS '20: Proceedings of the 2020 ACM Designing Interactive Systems Conference, Jul. 2020, pp. 1195-1209, Abstract (1 page) Accessed via the Internet: https://dl.acm.org/doi/10.1145/3357236.3395525.

Christian Arzate Cruz, et al., "A Survey on Interactive Reinforcement Learning: Design Principles and Open Challenges", arXiv:2105.12949v1 [cs. HC] May 27, 2021 (15 pages).

Junseok Park et al., "Toddler-Guidance Learning: Impacts of Critical Period on Multimodal AI Agents", Proceedings of the 2021 International Conference on Multimodal Interaction (ICMI '21), Oct. 18, 2021, pp. 212-220.

* cited by examiner (a) Real-World dataset(EAVE) objects (b) Virtual Environment
(VECA) objects (c) Example of datasets(Teddy bear)
captured from various angles

COMPUTING APPARATUS AND METHOD FOR PERFORMING REINFORCEMENT LEARNING USING MULTIMODAL ARTIFICIAL INTELLIGENCE AGENT

CROSS-REFERENCE TO RELATED APPLICATION

This application claims the benefit of Korean Patent Application No. 10-2021-0172384 filed on Dec. 3, 2021, which is hereby incorporated by reference herein in its entirety.

BACKGROUND

1. Technical Field

The embodiments disclosed herein relate to a computing apparatus and method for performing reinforcement learning using a multimodal artificial intelligence agent.

The present study was conducted as a result of the research into the following projects sponsored by the Korean Ministry of Science and ICT, the Institute of Information & Communications Technology Planning & Evaluation (IITP), and the National Research Foundation of Korea (NRF).

1) "Development of QA systems for Video Story Understanding to pass the Video Turing Test" task (IITP-2017-0-01772-005) of the Innovation Growth Engine Project
2) "Robot Manipulation Intelligence to learn Methods and Procedures for Handling Various Objects with Tactile Robot Hands" task (IITP-2018-0-00622-004) of the ICT Convergence Industry Innovation Technology Development Project
3) "(SW Star Lab) Cognitive Agents that Learn Everyday Life" task (IITP-2015-0-00310-007) of the SW Computing Industry Fundamental Technology Development Project
4) "Development of Brain-inspired AI with Human-like Intelligence" task (IITP-2019-0-01371-003) of the Innovative Growth Engine Project
5) "Goal-oriented Self-supervised Reinforcement Learning for Real-world Applications" task (NRF-2021R1A2C1010970) of the Basic Personal Research Project

2. Description of the Related Art

Although the performance of deep learning-based artificial neural network models has been improved due to the development of reinforcement learning-related technologies, real-time reinforcement learning in a large-scale data environment of the real world still incurs high costs and many limitations. Accordingly, research into a learning methodology that can be sufficiently applied to an agent (e.g., a robot) in the real world has been conducted.

There are critical periods during which brain development occurs rapidly in human toddlers. In these critical periods, the brain development and ability improvement of toddlers can be effectively achieved with the help of appropriate guidance from parents. A related study has been carried out on the assumption that if there are critical periods for an artificial intelligence agent, it will be possible to increase a learning effect more efficiently. The embodiments introduced herein have been conceived based on the results of this study.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

SUMMARY

An object of the embodiments disclosed herein is to provide a computing apparatus and method for performing reinforcement learning using a multimodal artificial intelligence agent that provide a reinforcement learning method having a high learning effect even for an artificial intelligence agent based on the fact that there are critical periods during which toddlers achieve an exceptionally high learning effect.

As a technical solution for accomplishing the above object, according to an embodiment, there is provided a method of performing reinforcement learning using a multimodal artificial intelligence agent, the method including: dividing frames, included in images acquired by capturing a virtual environment, into a plurality of sections; and performing reinforcement learning by applying any one of a plurality of guidance types to each of the plurality of sections and then allowing a multimodal artificial intelligence agent to interact with the virtual environment through the images; wherein the plurality of guidance types is classified into three or more types according to their guidance level; and wherein performing the reinforcement learning is performing reinforcement learning by applying a moderate-level guidance type to the sections of predetermined critical periods and also applying any one of the plurality of guidance types to the other sections.

According to another embodiment, there is provided a non-transitory computer-readable storage medium having stored thereon a program that, when executed by a processor, causes the processor to execute a method of performing reinforcement learning using a multimodal artificial intelligence agent, wherein the method includes dividing frames, included in images acquired by capturing a virtual environment, into a plurality of sections, and performing reinforcement learning by applying any one of a plurality of guidance types to each of the plurality of sections and then allowing a multimodal artificial intelligence agent to interact with the virtual environment through the images, wherein the plurality of guidance types is classified into three or more types according to their guidance level, and wherein performing the reinforcement learning is performing reinforcement learning by applying a moderate-level guidance type to the sections of predetermined critical periods and also applying any one of the plurality of guidance types to the other sections.

According to another embodiment, there is provided a computer program that is executed by an apparatus for providing game replays and stored in a non-transitory computer-readable storage medium in order to perform a method of performing reinforcement learning using a multimodal artificial intelligence agent, wherein the method includes dividing frames, included in images acquired by capturing a virtual environment, into a plurality of sections, and performing reinforcement learning by applying any one of a plurality of guidance types to each of the plurality of sections and then allowing a multimodal artificial intelligence agent to interact with the virtual environment through the images, wherein the plurality of guidance types is classified into three or more types according to their guidance level, and wherein performing the reinforcement learning is performing reinforcement learning by applying a moderate-level guidance type to the sections of predetermined critical periods and also applying any one of the plurality of guidance types to the other sections.

According to still another embodiment, there is provided a computing apparatus for performing reinforcement learning using a multimodal artificial intelligence agent, the computing apparatus including: an input/output interface configured to receive data and output the results of the operational processing of the data; storage configured to store a program and data for performing reinforcement learning using a multimodal artificial intelligence agent; and a controller including at least one processor, and configured to perform the reinforcement learning by executing the program; wherein the controller divides frames, included in images acquired by capturing a virtual environment, into a plurality of sections and also performs the reinforcement learning by applying any one of a plurality of guidance types to each of the plurality of sections and then allowing a multimodal artificial intelligence agent to interact with the virtual environment through the images by executing the program; wherein the plurality of guidance types is classified into three or more stages according to their guidance level; and wherein the controller performs the reinforcement learning by applying a moderate-level guidance type to sections of predetermined critical periods and also applying any one of the plurality of guidance types to the other sections.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
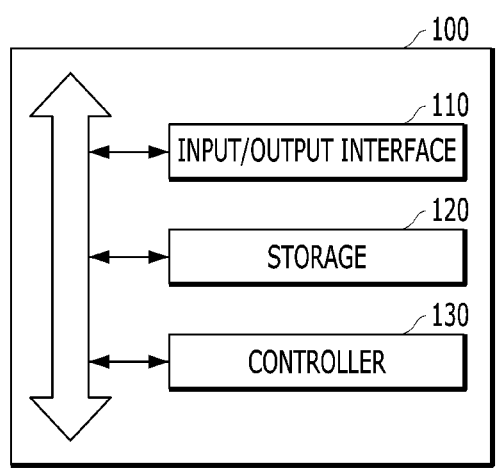
FIG. 1 is a diagram showing the configuration of a computing apparatus for performing reinforcement learning using a multimodal artificial intelligence agent according to an embodiment.

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is "directly connected" to the other component but also a case where the one component is "connected to the other component with a third component arranged therebetween." Furthermore, when one portion is described as "including" one component, this does not mean that the portion does not exclude another component but means that the portion may further include another component, unless explicitly described to the contrary.

Embodiments will be described in detail below with reference to the accompanying drawings. First, the configuration of a computing apparatus 100 for performing reinforcement learning using a multimodal artificial intelligence agent according to an embodiment will be briefly described with reference to FIG. 1. Next, a process of performing reinforcement learning using a multimodal artificial intelligence agent according to an embodiment will be described in detail with reference to FIGS. 2 to 5.

FIG. 1 is a diagram showing the configuration of the computing apparatus 100 for performing reinforcement learning using a multimodal artificial intelligence agent according to the present embodiment. Referring to FIG. 1, the computing apparatus 100 for performing reinforcement learning using a multimodal artificial intelligence agent according to the present embodiment may include an input/output interface 110, storage 120, and a controller 130.

The input/output interface 110 is configured to receive user commands or data related to reinforcement learning using a multimodal artificial intelligence agent, and to output the results of the performance of reinforcement learning using a multimodal artificial intelligence agent. The input/output interface 110 may include various types of input devices (e.g., a keyboard, a touch screen, etc.) for receiving input from a user. In addition, the input/output interface 110 may include a connection port or a communication module for transmitting and receiving data used for reinforcement learning using a multimodal artificial intelligence agent and the result data of reinforcement learning using a multimodal artificial intelligence agent.

The storage 120 is configured to store files and programs, and may be implemented as various types of memory. In particular, the storage 120 may store data and a program that enable the controller 130, which will be described later, to perform operations for reinforcement learning using a multimodal artificial intelligence agent according to a process to be presented below.

The controller 130 includes at least one processor, such as a central processing unit (CPU), and performs reinforcement learning using multimodal artificial intelligence agent according to the process to be presented below by executing the program stored in the storage 120. In other words, the reinforcement learning model 200 using a multimodal artificial intelligence agent shown in FIG. 2 is implemented in such a manner that the controller 130 executes the program stored in the storage 120, and the controller 130 performs learning through the reinforcement learning model 200.

A process in which the controller 130 performs reinforcement learning using a multimodal artificial intelligence agent according to an embodiment by executing the program stored in the storage 120 will be described in detail below with reference to FIGS. 1 to 5.

Figure 2:
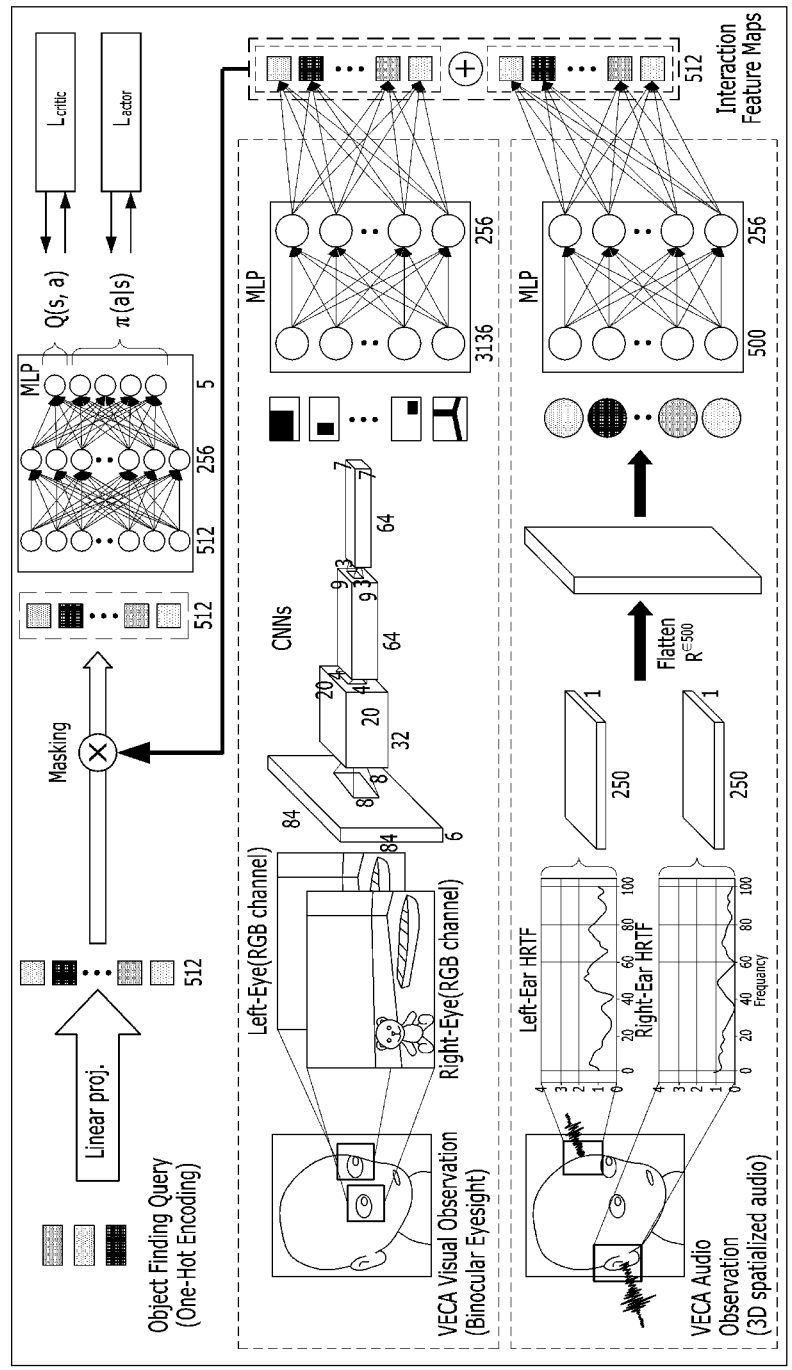
FIG. 2 is a diagram showing a reinforcement learning model using a multimodal artificial intelligence agent according to an embodiment.

FIG. 2 is a diagram showing the reinforcement learning model 200 using a multimodal artificial intelligence agent according to an embodiment.

As described above, the reinforcement learning model 200 using a multimodal artificial intelligence agent is implemented in such a manner that the controller 130 executes the program stored in the storage 120. Accordingly, an operation or process to be described as being performed by the reinforcement learning model 200 using a multimodal artificial intelligence agent in the following embodiments may be viewed as being performed by the controller 130 in reality. In addition, detailed components included in the reinforcement learning model 200 using a multimodal artificial intelligence agent may be viewed as software units that are responsible for specific functions or roles in an overall program for performing reinforcement learning using a multimodal artificial intelligence agent.

1. Training Process

A process of training a multimodal artificial intelligence agent will be described with reference to FIG. 2. Through the experiment of this training process, it may be possible to find critical periods present in a multimodal artificial intelligence agent and a guidance type capable of maximizing a learning effect in the critical periods.

Figure 3:
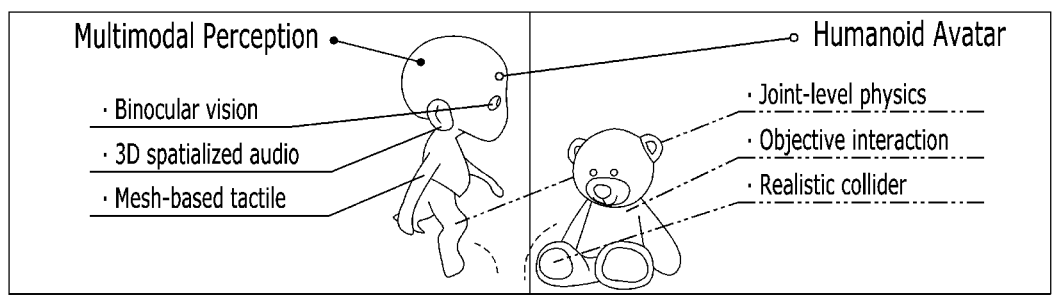
FIG. 3 is a diagram illustrating the humanoid characteristics of a multimodal artificial intelligence agent according to an embodiment.

The multimodal artificial intelligence agent used in the embodiments described herein has humanoid characteristics, as shown in FIG. 3. More specifically, the controller 130 may equip the multimodal artificial intelligence agent with binocular vision, 3D spatialized audio, mesh-based tactile, joint-level physics, objective interaction, and realistic collider characteristics.

Furthermore, in the embodiments described herein, the controller 130 implements a virtual environment such as a play area for toddlers by using a Virtual Environment for Cognitive Agent (VECA) tool in order to imitate the actual learning characteristics of toddlers.

The controller 130 may perform the reinforcement learning of the multimodal artificial intelligence agent using images acquired by capturing the virtual environment implemented in the above-described manner. In order to find critical periods and determine a guidance type suitable for the critical periods, frames included in the images are divided into a plurality of sections, and any one of a plurality of guidance types is applied to each of the sections.

In this case, it is assumed that the plurality of guidance types is classified into three stages according to their guidance level. More specifically, the plurality of guidance types is classified into weak-mentor guidance (sparse reward), moderate-mentor guidance (helper reward), and mentor demonstration (behavioral cloning).

Furthermore, in this case, it is assumed that the frames of the images are divided into different sections on a per-million frame basis.

Referring back to FIG. 2, a process in which a multimodal artificial intelligence agent having humanoid characteristics is trained using visual information and audio information will in be described. The training target images are acquired by capturing objects present in the virtual environment, and include images for binocular vision and 3D spatialized audio.

In the present embodiment, the controller 130 constructs a training process for learning general-purpose knowledge about objects through interaction with an environment in a manner similar to the learning process of toddlers. Although a Soft-Actor-Critic (SAC) algorithm is used as a reinforcement learning algorithm in the present embodiment, the present invention is not limited thereto, but various reinforcement learning algorithms may be used. The hyperparameters used in the SAC algorithm of the present embodiment are listed in Table 1 below:

TABLE 1

| Hyperparameter | Candidate Values | Optimal value |
|---|---|---|
| α (entropy coefficient) | {0.003, 0.01, 0.03} | 0.01 |
| Learning rate | {0.0001, 0.0003, 0.001} | 0.0003 |
| γ (discount factor) | {0.95, 0.99} | 0.99 |

First, training using visual information will be described. Since humans have binocular vision, the controller 130 performs an implementation similar to this, and processes images coming from both visual fields through a convolutional neural network and then passes the processed images through a first multilayer perceptron (MLP).

Next, training using audio information will be described. The controller 130 performs an implementation similar to the characteristics of humans having both ears, and vectorizes 3D spatialized audio on the assumption that the 3D spatialized audio is received through both ears and then passes the vectorized 3D spatialized audio through a second multilayer perceptron.

The controller 130 generates a 512-dimensional interaction feature map by integrating the output of the first multilayer perceptron and the output of the second multilayer perceptron. The controller 130 linearly projects an object finding query into 512 dimensions, performs masking on the results of the projection, and passes the results, on which the masking has been performed, through a third multilayer perceptron. In this case, the masking is performed based on the previously generated interactive feature map.

The output of the third multilayer perceptron includes five layers. One of the five layers is used as a Q(s, a) value and updated, and the other four layers are used as a π(a|s) value and updated. In this embodiment, the update of the SAC algorithm is set to be performed every 256 steps.

As a result of performing reinforcement learning on the multimodal artificial intelligence agent according to the training process described above, it may be found that the multimodal artificial intelligence agent has critical periods in 2M (million) sections and the highest learning effect is achieved when reinforcement learning is performed according to the moderate-mentor guidance in the critical periods.

In conclusion, when reinforcement learning is performed by applying a moderate-level guidance type to sections corresponding to the critical periods of the multimodal artificial intelligence agent and applying any one of the plurality of guidance types to the other sections, a high learning effect may be expected.

2. Transfer Learning

Transfer learning may be used to revalidate the performance of the model on which reinforcement learning has been performed according to the method described above.

Figure 4:
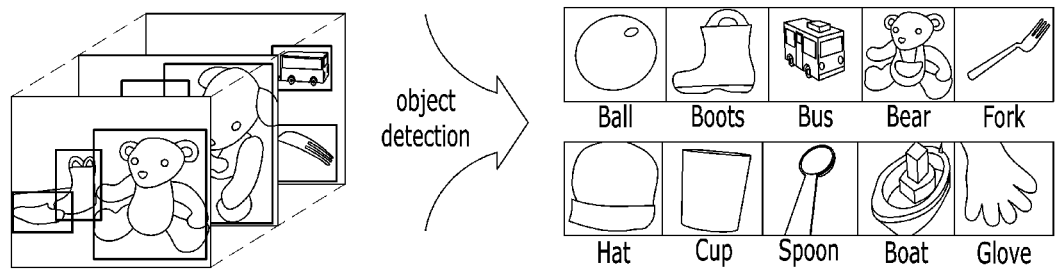
FIG. 4 is a diagram illustrating an EAVE data set collected according to an embodiment.
Figure 4:
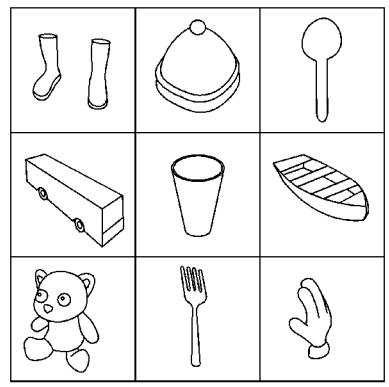
Figure 4:
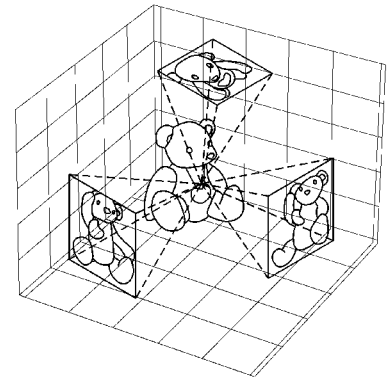

An Egocentric Audio-Visual Exploration (EAVE) data set including 30,000 images reflecting the characteristics of the real point of view of toddlers is prepared to verify that the multimodal artificial intelligence agent trained in the virtual environment has critical periods having a high learning effect. The EAVE data set includes image data collected from real objects that are the same as the objects used for learning in the virtual environment. In more detail, the EAVE data set is a data set that is generated by reflecting human cognitive factors. For example, since humans learn objects while viewing them from various distances and angles, the EAVE data set is constructed by taking into consideration the cognitive characteristics of toddlers in the present embodiment. An example of the EAVE data set constructed in the above-described manner is shown in FIG. 4.

Figure 5:
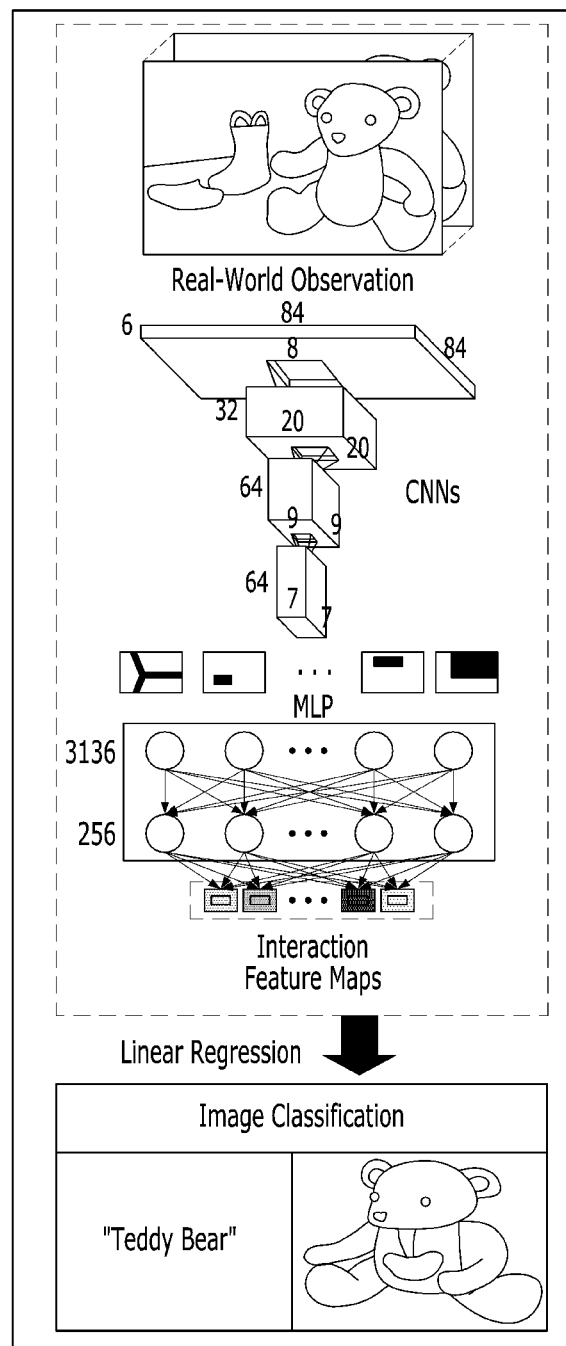
FIG. 5 is a diagram illustrating a process of performing transfer learning on an EAVE data set according to an embodiment.

FIG. 5 is a diagram illustrating a process of performing transfer learning on an EAVE data set according to an embodiment. Referring to FIG. 5, the parameters of a convolutional neural network trained by reflecting binocular vision therein are transferred to the EAVE data set through transfer learning. As a result, it is found that the above model has higher learning performance than a model in which reinforcement learning is performed without taking into consideration critical periods. As described above, it may be revalidated that the critical periods are present in the artificial intelligence model by performing transfer learning using the EAVE data set.

Meanwhile, the optimal guidance type for the critical periods may be represented by the following Equation 1 based on reinforcement learning:

$$(G^*, t_G^*) = \underset{G, t_G}{\operatorname{argmax}} \left( \underset{\theta \sim Pr(\theta | G, t_G)}{\max} \mathbb{E}_{\pi_\theta}(J_T(\pi_\theta)) \right) \quad (1)$$

A reward structure based on the optimal guidance type according to the critical periods is defined as $\{G_j\}$, and $J_T(\pi_\theta)$ corresponds to the performance of a policy parameter $\theta$ for a task T. In this case, $Pr(\theta|G, t_G)$ is defined as a trained policy distribution value within a mentor's guidance $R = G \in \{G_j\}$ and a corresponding learning period $t_G$. Finally, the equation for the optimal guidance type in the critical periods is defined as $(G^*, t^*_G)$, which means that the best performance is provided for the specific task T.

Figure 6:
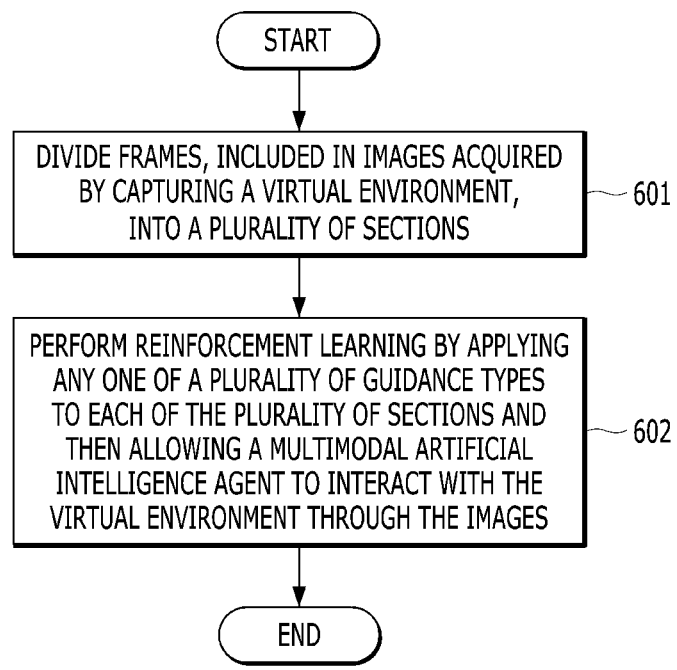
FIGS. 6 and 7 are flowcharts illustrating a method of performing reinforcement learning using a multimodal artificial intelligence agent according to embodiments.
Figure 7:
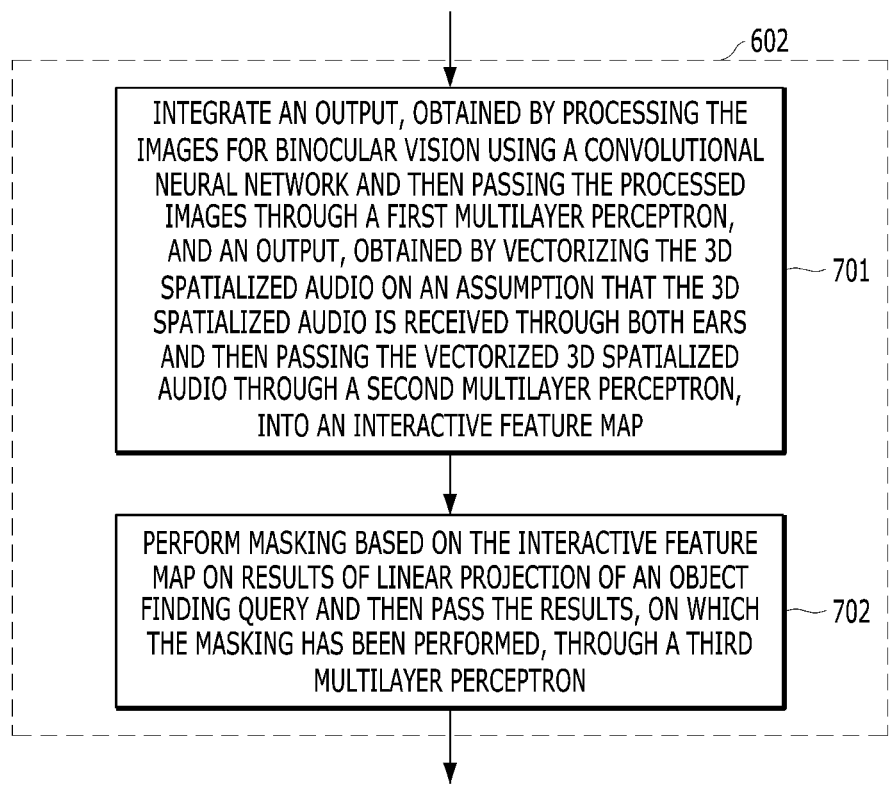

A method of performing reinforcement learning using a multimodal artificial intelligence agent by means of the above-described computing apparatus 100 for performing reinforcement learning using a multimodal artificial intelligence agent will be described below. FIGS. 6 and 7 are flowcharts illustrating a method of performing reinforcement learning using a multimodal artificial intelligence agent according to embodiments.

The method of performing reinforcement learning using a multimodal artificial intelligence agent according to the embodiments shown in FIGS. 6 and 7 includes steps that are processed in a time-series manner by the computing apparatus 100 for performing reinforcement learning using a multimodal artificial intelligence agent shown in FIG. 1. Accordingly, the descriptions that are omitted below but have been given above in conjunction with the computing apparatus 100 for performing reinforcement learning using a multimodal artificial intelligence agent shown in FIG. 1 may also be applied to the method of performing reinforcement learning using a multimodal artificial intelligence agent according to the embodiments shown in FIGS. 6 and 7.

Referring to FIG. 6, in step 601, the controller 130 divides frames, included in images acquired by capturing the virtual environment, into a plurality of sections.

In step 602, the controller 130 performs reinforcement learning by applying any one of a plurality of guidance types to each of the plurality of sections and then allowing the multimodal artificial intelligence agent to interact with the virtual environment through the images. In this case, the plurality of guidance types may be classified into three or more stages according to their guidance level. Furthermore, the controller 130 may perform reinforcement learning by applying a moderate-level guidance type to the sections of predetermined critical periods and also applying any one of the plurality of guidance types to the other sections.

FIG. 7 shows detailed steps included in step 602 of FIG. 6. Referring to FIG. 7, in step 701, the controller 130 integrates the output, obtained by processing images for binocular vision using a convolutional neural network and then passing the processed images through the first multilayer perceptron, and the output, obtained by vectorizing 3D spatialized audio on the assumption that the 3D spatialized audio is received through both ears and then passing the vectorized 3D spatialized audio through the second multilayer perceptron, into an interactive feature map.

In step 702, the controller 130 performs masking based on the interactive feature map on the results of the linear projection of an object finding query, and then passes the results, on which the masking has been performed, through the third multilayer perceptron.

The term "unit" used in the above-described embodiments means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more central processing units (CPUs) in a device or secure multimedia card.

The method of performing reinforcement learning using a multimodal artificial intelligence agent according to the embodiments descried through FIGS. 2 to 7 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method of performing reinforcement learning using a multimodal artificial intelligence agent according to the embodiments descried through FIGS. 2 to 7 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method of performing reinforcement learning using a multimodal artificial intelligence agent according to the embodiments descried through FIGS. 2 to 7 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within a computing apparatus. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing apparatus. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

According to the embodiments described above, the effect of increasing a learning effect can be expected without changing a reinforcement learning algorithm itself by applying a learning methodology that utilizes critical periods present in human toddlers.

The effects that can be obtained by the embodiments disclosed herein are not limited to the effect described above, and other effects not described above will be clearly understood by those having ordinary skill in the art, to which the present invention pertains, from the foregoing description.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

What is claimed is:

1. A method of performing reinforcement learning using a multimodal artificial intelligence agent, the method comprising:
dividing frames, included in images acquired by capturing a virtual environment, into a plurality of sections; and
performing the reinforcement learning by applying any one of a plurality of guidance levels to each of the plurality of sections and then allowing the multimodal artificial intelligence agent to interact with the virtual environment through the images,
wherein the plurality of guidance levels are classified into three or more stages which comprise a weak-mentor guidance, a moderate-mentor guidance, and a mentor demonstration,
wherein the performing of the reinforcement learning comprises performing the reinforcement learning by applying the moderate-mentor guidance to sections of predetermined critical periods and also applying any one of the plurality of guidance levels to remaining sections, and
wherein the images are acquired by capturing one or more objects in the virtual environment, and the images include one or more images for binocular vision and three-dimensional (3D) spatialized audio.

2. The method of claim 1, wherein the performing of the reinforcement learning further comprises:
integrating a first output, obtained by processing the images for the binocular vision using a convolutional neural network and then passing the processed images through a first multilayer perceptron, and a second output, obtained by vectorizing the 3D spatialized audio on an assumption that the 3D spatialized audio is received through both ears and then passing the vectorized 3D spatialized audio through a second multilayer perceptron, into an interactive feature map; and
performing masking based on the interactive feature map on results of linear projection of an object finding query and then passing the results, on which the masking has been performed, through a third multilayer perceptron.

3. The method of claim 1, wherein the multimodal artificial intelligence agent is equipped with the binocular vision, 3D spatialized audio, mesh-based tactile, joint-level physics, objective interaction, and realistic collider characteristics.

4. A non-transitory computer-readable storage medium having stored thereon a program that, when executed by a processor, causes the processor to execute the method of performing reinforcement learning using a multimodal artificial intelligence agent set forth in claim 1.

5. A computer program that is executed by an apparatus for providing game replays and stored in a non-transitory computer-readable storage medium in order to perform the method of performing reinforcement learning using a multimodal artificial intelligence agent set forth in claim 1.

6. A computing apparatus for performing reinforcement learning using a multimodal artificial intelligence agent, the computing apparatus comprising:

an input/output interface configured to receive data and output results of operational processing of the data;

storage configured to store a program and data for the performing of the reinforcement learning using the multimodal artificial intelligence agent; and a controller including at least one processor, and configured to perform the reinforcement learning by executing the program;

wherein the controller divides frames, included in images acquired by capturing a virtual environment, into a plurality of sections and also performs the reinforcement learning by applying any one of a plurality of guidance levels to each of the plurality of sections and then allowing the multimodal artificial intelligence agent to interact with the virtual environment through the images by executing the program, wherein the plurality of guidance levels are classified into three or more stages which comprise a weak-mentor guidance, a moderate-mentor guidance, and a mentor demonstration, wherein the controller performs the reinforcement learning by applying the moderate-mentor guidance to sections of predetermined critical periods and also applying any one of the plurality of guidance levels to remaining sections, and wherein the images are acquired by capturing one or more objects in the virtual environment, and the images include one or more images for binocular vision and three-dimensional (3D) spatialized audio.

7. The computing apparatus of claim 6, wherein the controller performs the reinforcement learning by:

integrating a first output, obtained by processing the images for the binocular vision using a convolutional neural network and then passing the processed images through a first multilayer perceptron, and a second output, obtained by vectorizing the 3D spatialized audio on an assumption that the 3D spatialized audio is received through both ears and then passing the vectorized 3D spatialized audio through a second multilayer perceptron, into an interactive feature map; and performing masking based on the interactive feature map on results of linear projection of an object finding query and then passing the results, on which the masking has been performed, through a third multilayer perceptron.

8. The computing apparatus of claim 6, wherein the controller equips the multimodal artificial intelligence agent with the binocular vision, 3D spatialized audio, mesh-based tactile, joint-level physics, objective interaction, and realistic collider characteristics.

* * * * *